(12) United States Patent
Stanev et al.

(10) Patent No.: US 7,473,041 B2
(45) Date of Patent: Jan. 6, 2009

(54) MODULAR PAN AND TILT SYSTEM

(76) Inventors: Stefan Stanev, 1349 W. 166th St., Gardena, CA (US) 90247; Roger Heinz, 1349 W. 166th St., Gardena, CA (US) 90247; John Heinz, 1349 W. 166th St., Gardena, CA (US) 90247

(\*) Notice: Subject to any disclaimer, the term of this patent is extended or adjusted under 35 U.S.C. 154(b) by 146 days.

(21) Appl. No.: 11/678,013

(22) Filed: Feb. 22, 2007

(65) Prior Publication Data

US 2008/0205877 A1 Aug. 28, 2008

(51) Int. Cl.
G03B 17/00 (2006.01)
G03B 19/18 (2006.01)
G03B 21/00 (2006.01)
F16M 11/32 (2006.01)

(52) U.S. Cl. ............ 396/428; 248/440.1; 352/53; 352/243

(58) Field of Classification Search .......... 396/427, 396/428, 329; 310/112; 248/129, 440.1; 348/211.7; 352/53, 243
See application file for complete search history.

(56) References Cited

U.S. PATENT DOCUMENTS

| | | | |
|---|---|---|---|
| 4,222,540 A | 9/1980 | King et al. | 248/205 R |
| 4,233,634 A | 11/1980 | Adams | 348/373 |
| 4,673,268 A | 6/1987 | Wheeler et al. | 352/243 |
| 4,728,839 A | 3/1988 | Coughlan et al. | 310/112 |
| 4,945,367 A | 7/1990 | Blackshear | 396/427 |
| 5,028,997 A | 7/1991 | Elberbaum | 348/143 |
| 5,220,848 A | 6/1993 | Basilico | 74/471 XY |
| 5,418,567 A | 5/1995 | Boers et al. | 348/378 |
| 5,463,432 A | 10/1995 | Kahn | 352/243 |
| 5,606,368 A | 2/1997 | Corradini | 348/373 |
| 5,617,762 A | 4/1997 | Kirsch | 74/490.06 |
| 5,768,647 A | 6/1998 | Coffln et al. | 396/428 |
| 5,802,412 A | 9/1998 | Kahn | 396/427 |
| 5,850,579 A | 12/1998 | Melby et al. | 396/427 |
| 5,900,925 A | 5/1999 | Navarro | 352/53 |
| 6,027,257 A | 2/2000 | Richards et al. | 396/428 |
| 6,356,308 B1 | 3/2002 | Hovanky | 348/373 |
| 6,503,000 B1 | 1/2003 | Kim | 396/427 |
| 6,652,164 B2 | 11/2003 | Stiepel et al. | 396/427 |
| 6,880,987 B2 | 4/2005 | Diana et al. | 396/427 |
| 7,019,785 B2 | 3/2006 | Masuyama et al. | 348/374 |
| 2006/0233544 A1* | 10/2006 | Coppola | 396/428 |

\* cited by examiner

*Primary Examiner*—Melissa J Koval
(74) *Attorney, Agent, or Firm*—David A. Belasco; Belasco Jacobs & Townsley, LLP

(57) ABSTRACT

A modular pan and tilt system includes a combination of inline and/or right angle rotational platforms. The platforms each include a housing having a cross-section of uniform dimensions extending from a first end toward a second end and a drive motor mounted within the housing having an output shaft parallel to a long axis of the housing. A mounting plate is driven at an axis of rotation by the output shaft and has at least one attachment fixture for securing the mounting plate to equipment for positioning or a mounting surface. The right angle platform includes a right angle drive gear train attached to the output shaft. A clamping block has two pair of parallel mounting holes mounted at right angles to each other. The mounting holes are sized and shaped to fit slidably about the housings. A securing fixture holds the housings in any two of the mounting holes.

15 Claims, 4 Drawing Sheets

MODULAR PAN AND TILT SYSTEM

FIELD OF INVENTION

The invention pertains to devices for precisely controlling equipment positioning. More particularly, the invention relates to modular systems for mounting and controlling the motion and position of cameras and other equipment.

BACKGROUND OF THE INVENTION

As motion picture and photographic recording tasks become more sophisticated and complex, the need for systems that can position a camera or other equipment with speed and precision has increased. In addition, recording equipment has evolved into a wide variety shapes and form factors. Often these different form factors require different devices to properly mount and control the equipment. Traditionally, these different types of equipment required different mounting fixtures of different equipment sizes and configurations. As the cost for using these more sophisticated devices increased, interest developed in finding ways to adapt standardized mounting and positioning gear to work with a wide variety of equipment. Various designs for equipment mounting and positioning systems have been developed. The present invention utilizes modular design concepts to provide precision flexible mounting and control of a wide variety of equipment, easily and rapidly adapted to a variety of circumstances at a reasonable cost.

U.S. Pat. No. 4,222,540, issued to King et al., discloses an apparatus for holding a camera adjacent a tube sheet having a plurality of tubes disposed therein and for providing pan and tilting movement of the camera. The invention comprises a base, a sleeve rotatably disposed in the base and having internal threads, a threaded shaft threadedly engaging the sleeve and a drive for rotating the sleeve to move the base up and down the shaft. The apparatus also comprises a bracket disposed on the base, a camera platform pivotly mounted on the bracket and a drive for pivoting the platform with respect to the bracket. A pin insertable in a tube and incorporating a device for expanding the pin in holding engagement with the tube to hold the apparatus in the tube and a device for rotating the platform to provide panning of the camera, is also incorporated in the apparatus.

U.S. Pat. No. 4,233,634, issued to Adams is directed to a video camera tilt and pan head that includes a bifurcated support which is free to pivot about a vertical axis for the "pan" action of the video camera. A camera cradle receives the video camera and the cradle is provided with slots and a tie-down bolt such that the camera is adjustable horizontally with respect to the cradle. The cradle is supported on transverse mounting pivots secured in the support. The pivots clamp in vertical cradle slots, enabling the cradle to be adjustable vertically with respect to the pivots. The pivots may be tubular to act as sight tubes to locate the cradle and camera with respect to the desired pivot axes. A tray extends from the cradle to receive weights to counterbalance the extension of the video camera beyond the transverse pivots. The camera exterior is indexed to indicate the point at which the axes of each of the red, green and blue receptors intersect the lens axis of the camera. This point establishes the desired path for tilt and pan axes. Motorized gear drives accomplish tilt and pan motions of one camera in response to the selective movement of like pan and tilt gears on a companion camera such that the companion camera and a camera fixed in the mount of the invention move in synchronism.

U.S. Pat. No. 4,673,268, issued to Wheeler et al. illustrates a remote operable pan and tilt mount for a television camera or the like which is capable of 360 degrees of pan rotational in either direction, accurately positionable and repositionable to a selected 1/100 of a degree of arc in either pan or tilt rotational position, has accurate rotational speed control through a wide range of operational speeds, has good starting and running torque and can be remotely operated manually or by computer control.

U.S. Pat. No. 4,728,839, issued to Coughlan et al. discloses a motorized pan/tilt head and support member for mounting a video camera or the like. A pan/tilt head is mounted upon a first end of the support member. This head is substantially U-shaped, with a bottom cross member and parallel legs at opposite ends of the cross member. The video camera or the like is pivotally suspended between the two legs. Electric motors housed within the cross member and legs, provide panning and tilting motion through the use of gear mechanisms attached to the motors. In order to provide closed loop control, position sensing devices are driven by each of the motors to provide an output signal related to position. The electrical wires of the components pass along the central axis of the support member and terminate at an electrical plug at the second end thereof. This plug mates with a second portion affixed to a surface to which the support member is to be releasably attached.

U.S. Pat. No. 4,945,367, issued to Blackshear is directed to a surveillance camera system that comprises a spherical housing having a partially transparent lower, hemispherically shaped gold coated dome with a geometric center. A camera mount is mounted in the housing for panning movements about a vertical pan axis and tilting movement about a horizontal tilt axis. A video camera is mounted to the camera mount and electric motors are mounted for panning and tilting the mount and camera. A computer and control circuit is mounted to the camera mount and coupled to actuate the electric motors to orient the camera and to actuate the camera zoom and focus as well as to enhance the camera's video image with descriptive word captions.

U.S. Pat. No. 5,463,432, issued to Kalim discloses a computer-controlled miniature pan/tilt tracking mount for the precise control of position, velocity, and acceleration of small payloads (e.g., a video camera). The invention consists of a motorized rotational tilt axis mounted atop a motorized rotational pan axis. For both axes, a worm gear mounted upon the motor shaft bidirectionally rotates a worm wheel mounted upon the orthogonal load axis shaft. A large ratio of motor size to armature weight provides high relative torque, speed, and accuracy. The worm gears provide compact reduction with minimal backlash and they can hold position without energized motors to conserve power for battery-operated uses. The invention includes integrated motor drive power electronics and microcontroller execution of host computer commands to effect precise control of pan/tilt mount speed, acceleration, position, configuration, and motor and electronics power consumption. Superior motor drive capabilities are achieved by the use of pulse-width modulation (PWM).

It is an objective of the present invention to provide precision pan and tilt control for mounting cameras and other similar equipment. It is a further objective to provide such precision positioning control through a system that is readily adaptable to equipment of different sizes and proportions. It is a still further objective of the invention to provide a system that can be easily assembled and disassembled for reconfiguration under changing field circumstances. Finally, it is an objective of the present invention to provide these capabilities is a system that is inexpensive and rugged.

SUMMARY OF THE INVENTION

The present invention addresses all of the deficiencies of prior art modular pan and tilt inventions and satisfies all of the objectives described above.

(1) A modular pan and tilt system providing the desired features may be constructed from the following components. First and second inline rotational platforms are provided. Each of the inline platforms includes a housing. The housing has a first end, a second end, a cross-section of uniform dimensions extending from the first end toward the second end. A drive motor is provided. The drive motor is mounted within the housing and has an output shaft parallel to a long axis of the housing. A mounting plate is provided. The mounting plate is driven at an axis of rotation by the output shaft and has at least one attachment fixture for securing the mounting plate to either equipment for positioning or a mounting surface.

A clamping block is provided. The block has a first pair of parallel mounting holes and a second pair of parallel mounting holes located orthogonally to the first pair. The mounting holes are sized and shaped to fit slidably about the housing. A secure fixture is provided. The fixture secures the housings in any two of the orthogonally located mounting holes. When the two inline rotational platforms are secured in two orthogonally located mounting holes of the clamping block, a mounting plate of a first one of the platforms is secured to a mounting surface and a mounting plate of a second one of the platforms is secured to the equipment for positioning, the equipment will pan and tilt according to input to the two inline rotational platforms.

(2) In a variant of the invention, a gear train is provided. The gear train is located between the drive motor and the output shaft of at least one of the inline rotational platforms.

(3) In another variant, a resilient sleeve is provided. The sleeve is sized and shaped to fir closely between the housing and the drive motor of at least one of the inline rotational platforms.

(4) In still another variant, the clamping block further includes a first slit. The first slit extends between the first pair of parallel mounting holes. A second slit is provided. The second slit extends between the second pair of parallel mounting holes. The securing fixture compresses the first and second slits to secure the housings within the mounting holes.

(5) In yet another variant, the securing fixture further includes an aperture. The aperture has a first end, a second end and is located between both of the first and second pairs of parallel mounting holes. The aperture has an internal thread adjacent the first end and an opening at the second end. A bolt is provided. The bolt is sized and shaped to fit slidably into the aperture, has a mating external thread at a distal end, a head larger than the aperture at a proximal end and a turning feature located upon the head.

(6) In a further variant, a modular pan and tilt system, includes an inline rotational platform. The inline platform includes a first housing. The first housing has a first end, a second end, a cross-section of uniform dimensions extending from the first end toward the second end. A drive motor is provided. The drive motor is mounted within the first housing and has an output shaft parallel to a long axis of the housing. A mounting plate is provided. The mounting plate is driven at an axis of rotation by the output shaft and has at least one attachment fixture for securing the mounting plate to either equipment for positioning or a mounting surface.

A right angle rotational platform is provided. The right angle platform includes a second housing. The second housing has a first end, a second end, a cross-section of uniform dimensions extending from the first end toward the second end. A drive motor is provided. The drive motor is mounted within the second housing and has an output shaft parallel to a long axis of the second housing. A gear box is provided. The gear box has a right angle gear train rotatably attached to the output shaft. The gear box is mounted to the second end of the second housing. A mounting plate is provided. The mounting plate is driven at an axis of rotation by a drive shaft of the gear box and has at least one attachment fixture for securing the mounting plate to either equipment for positioning or a mounting surface.

A clamping block is provided. The block has a first pair of parallel mounting holes and a second pair of parallel mounting holes located orthogonally to the first pair. The mounting holes are sized and shaped to fit slidably about either of the first and second housings. A securing fixture is provided. The fixture secures the housings in any two of the orthogonally located mounting holes. When the inline rotational platform and the right angle rotational platform are secured in two orthogonally located mounting holes of the clamping block, a mounting plate of one of the platforms is secured to a mounting surface and a mounting plate of another of the platforms is secured to the equipment for positioning, the equipment will pan and tilt according to input to the rotational platforms.

(7) In still a further variant, a gear train is provided. The gear train is located between the drive motor and the output shaft of the inline rotational platform.

(8) In yet a further variant, a first resilient sleeve is provided. The first sleeve is sized and shaped to fir closely between the first housing and the drive motor of the inline rotational platform.

(9) In another variant of the invention, a second resilient sleeve is provided. The second sleeve is sized and shaped to fir closely between the second housing and the drive motor of the right angle rotational platform.

(10) In still another variant, the clamping block further includes a first slit. The first slit extends between the first pair of parallel mounting holes. A second slit is provided. The second slit extending between the second pair of parallel mounting holes. The securing fixture compresses the first and second slits to secure the first and second housings within the mounting holes.

(11) In yet another variant, the securing fixture further includes an aperture. The aperture has a first end, a second end, is located between both of the first and second pairs of parallel mounting holes, has an internal thread adjacent the first end and an opening at the second end. A bolt is provided. The bolt is sized and shaped to fit slidably into the aperture, has a mating external thread at a distal end, a head larger than the aperture at a proximal end and a turning feature located upon the head.

(12) In a further variant, a modular pan and tilt system, includes first and second right angle rotational platforms. Each of the right angle platforms includes a housing. The housing has a first end, a second end, a cross-section of uniform dimensions extending from the first end toward the second end. A drive motor is provided. The drive motor is mounted within the housing and has an output shaft parallel to a long axis of the housing. A gear box is provided. The gear box has a right angle gear train rotatably attached to the output shaft and is mounted to the second end of the housing. A mounting plate is provided. The mounting plate is driven at an axis of rotation by a drive shaft of the gear box and has at least one attachment fixture for securing the mounting plate to either equipment for positioning or a mounting surface. A clamping block is provided. The block has a first pair of parallel mounting holes and a second pair of parallel mounting holes located orthogonally to the first pair. The mounting holes are sized and shaped to fit slidably about the housings. A securing fixture is provided. The fixture secures the housings in any two of the orthogonally located mounting holes. When the right angle rotational platforms are secured in two orthogonally located mounting holes of the clamping block, a mounting plate of one of the platforms is secured to a mounting surface and a mounting plate of another of the platforms is secured to the equipment for positioning, the equipment will pan and tilt according to input to the two right angle rotational platforms.

(13) In still a further variant, a resilient sleeve is provided. The sleeve is sized and shaped to fir closely between the housing and the drive motor of the right angle rotational platform.

(14) In yet a further variant, the clamping block further includes a first slit. The first slit extends between the first pair of parallel mounting holes. A second slit is provided. The second slit extends between the second pair of parallel mounting holes. The securing fixture compresses the first and second slits to secure the housings within the mounting holes.

(15) In a final variant of the invention, the securing fixture further includes an aperture. The aperture has a first end, a second end, is located between both of the first and second pairs of parallel mounting holes, has an internal thread adjacent the first end and an opening at the second end. A bolt is provided. The bolt is sized and shaped to fit slidably into the aperture, has a mating external thread at a distal end, a head larger than the aperture at a proximal end and a turning feature located upon the head.

An appreciation of the other aims and objectives of the present invention and an understanding of it may be achieved by referring to the accompanying drawings and the detailed description of a preferred embodiment.

DESCRIPTION OF THE DRAWINGS

DETAILED DESCRIPTION OF THE PREFERRED EMBODIMENT (1) FIGS. 2, 5, 6 and 7 illustrate a modular pan and tilt system 10 providing the desired features that may be constructed from the following components. As illustrated in FIGS. 1 and 2, first 14 and second 18 inline rotational platforms are provided. Each of the inline platforms 14, 18 includes a housing 22. The housing 22 has a first end 26, a second end 30, a cross-section of uniform dimensions 34 extending from the first end 26 toward the second end 30. A drive motor 38 is provided. The drive motor 38 is mounted within the housing 22 and has an output shaft 42 parallel to a long axis 46 of the housing 22. A mounting plate 50 is provided. The mounting plate 50 is driven at an axis of rotation 54 by the output shaft 42 and has at least one attachment fixture 58 for securing the mounting plate 50 to either equipment for positioning 62 or a mounting surface 66, as illustrated in FIG. 7.

As illustrated in FIGS. 2 and 3, a clamping block 70 is provided. The block 70 has a first pair of parallel mounting holes 74 and a second pair of parallel mounting holes 78 located orthogonally to the first pair 74. The mounting holes 74, 78 are sized and shaped to fit slidably about the housing 22. A secure fixture 82 is provided. The fixture 82 secures the housings 22 in any two of the orthogonally located mounting holes 74, 78. When the two inline rotational platforms 14, 18 are secured in two orthogonally located mounting holes 74, 78 of the clamping block 70, a mounting plate 50 of a first one of the platforms 14, 18 is secured to a mounting surface 66 and a mounting plate 50 of a second one of the platforms 14, 16 is secured to the equipment for positioning 62, the equipment 62 will pan and tilt according to input to the two inline rotational platforms 14, 18.

Figure 1:
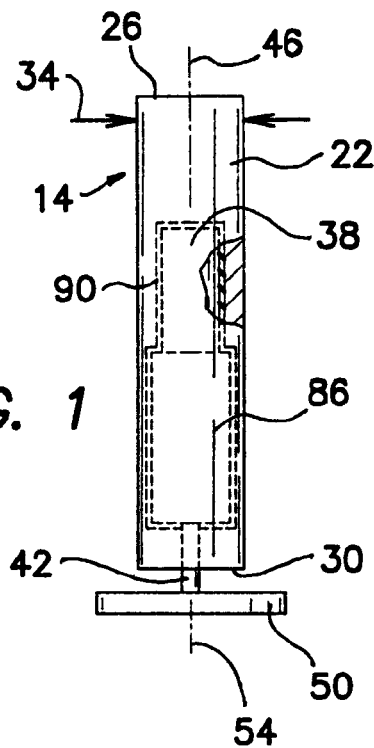
FIG. 1 is a side elevational view of an inline rotational platform.

(2) In a variant of the invention, as illustrated in FIG. 1, a gear train 86 is provided. The gear train 86 is located between the drive motor 38 and the output shaft 42 of at least one of the inline rotational platforms 14, 18.

(3) In another variant, a resilient sleeve 90 is provided. The sleeve 90 is sized and shaped to fir closely between the housing 22 and the drive motor 38 of at least one of the inline rotational platforms 14, 16.

Figure 2:
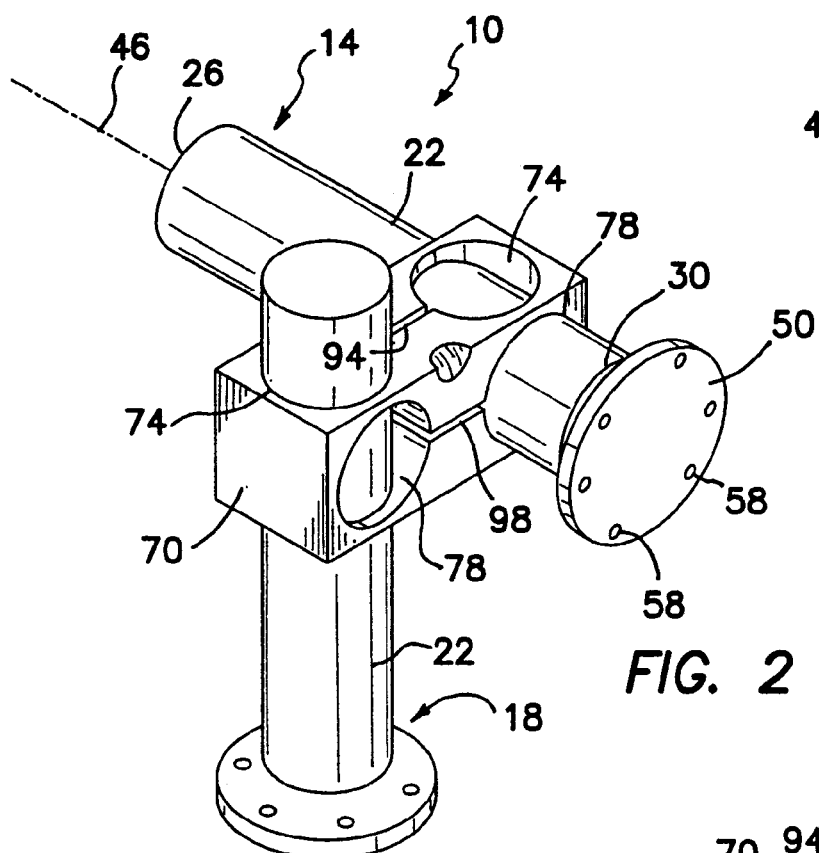
FIG. 2 is a perspective view of a first embodiment of the invention including two of the FIG. 1 rotational platforms and a clamping block.
Figure 3:
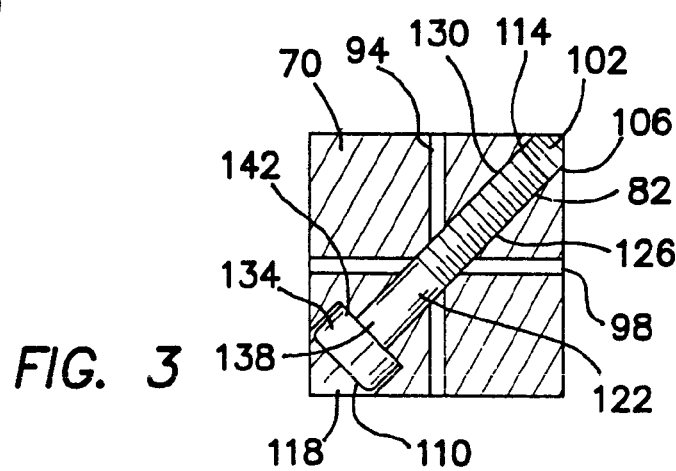
FIG. 3 is a side cross-sectional view of the clamping block.

(4) In still another variant, as illustrated in FIGS. 2 and 3, the clamping block 70 further includes a first slit 94. The first slit 94 extends between the first pair of parallel mounting holes 74. A second slit 98 is provided. The second slit 98 extends between the second pair of parallel mounting holes 78. The securing fixture 82 compresses the first 94 and second 98 slits to secure the housings 22 within the mounting holes 74, 78.

(5) In yet another variant, the securing fixture 82 further includes an aperture 102. The aperture 102 has a first end 106, a second end 110 and is located between both of the first 74 and second 78 pairs of parallel mounting holes. The aperture 102 has an internal thread 114 adjacent the first end 106 and an opening 118 at the second end 110. A bolt 122 is provided. The bolt 122 is sized and shaped to fit slidably into the aperture 102, has a mating external thread 126 at a distal end 130, a head 134 larger than the aperture 102 at a proximal end 138 and a turning feature 142 located upon the head 134.

Figure 5:
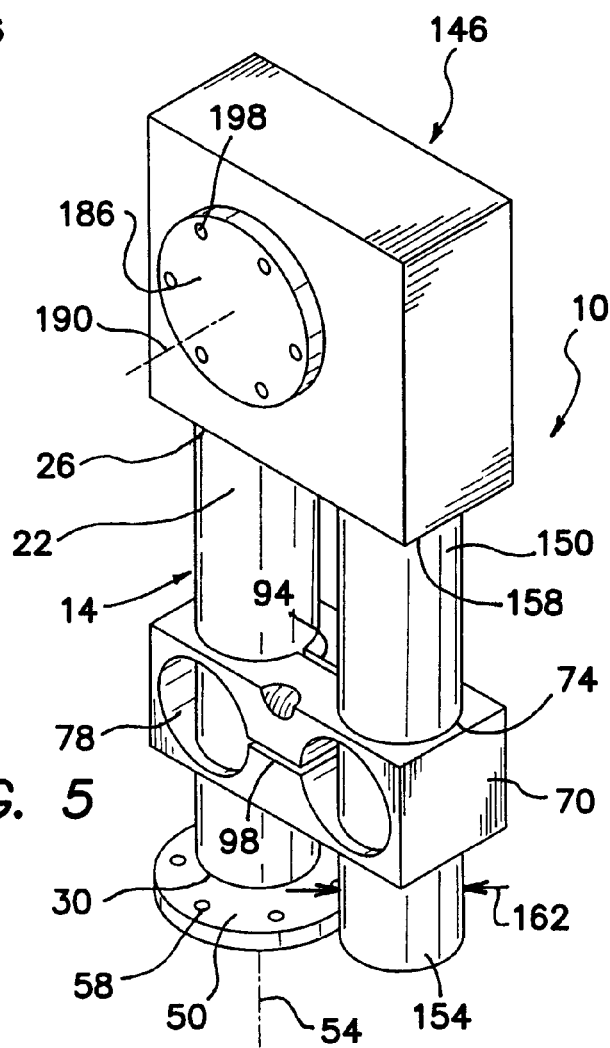
FIG. 5 is a perspective view of a second embodiment of the invention illustrating an inline rotational platform, a right angle rotational platform and the clamping block.

(6) In a further variant, as illustrated in FIG. 5, a modular pan and tilt system 10, includes an inline rotational platform 14. The inline platform 14 includes a first housing 22. The first housing 22 has a first end 26, a second end 30, a cross-section of uniform dimensions 34 extending from the first end 26 toward the second end 30. A drive motor 38 is provided. The drive motor 38 is mounted within the first housing 22 and has an output shaft 42 parallel to a long axis 46 of the housing 22. A mounting plate 50 is provided. The mounting plate 50 is driven at an axis of rotation 54 by the output shaft 42 and has at least one attachment fixture 58 for securing the mounting plate 50 to either equipment for positioning 62 or a mounting surface 66.

Figure 4:
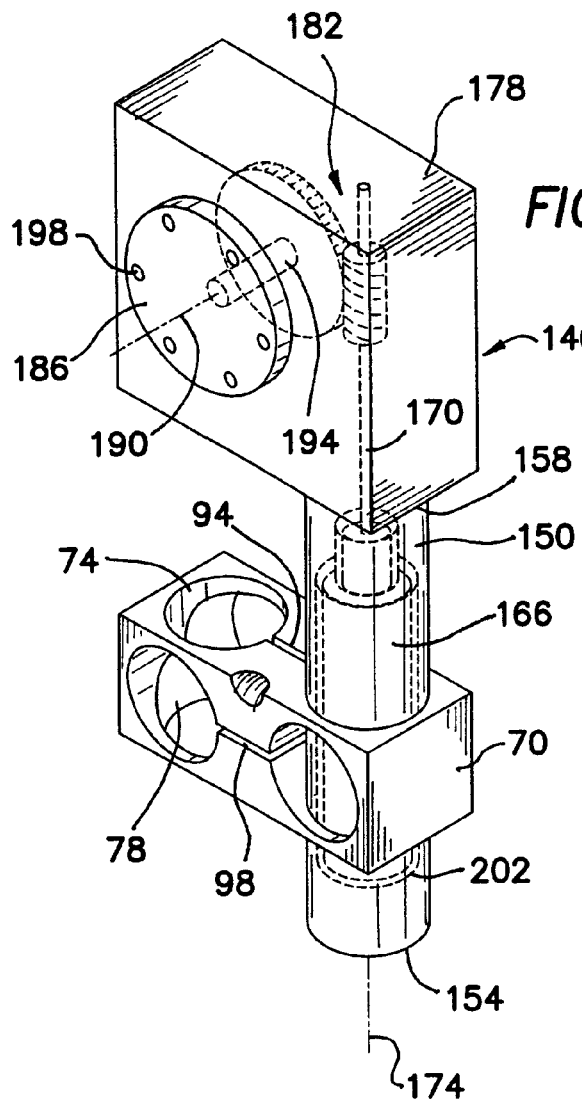
FIG. 4 is a perspective view of a right angle rotational platform illustrating the motor and right angle drive train and the clamping block.

As illustrated in FIGS. 4 and 5, a right angle rotational platform 146 is provided. The right angle platform 146 includes a second housing 150. The second housing 150 has a first end 154, a second end 158, a cross-section of uniform dimensions 162 extending from the first end 154 toward the second end 158. A drive motor 166 is provided. The drive motor 166 is mounted within the second housing 150 and has an output shaft 170 parallel to a long axis 174 of the second housing 150. A gear box 178 is provided. The gear box 178 has a right angle gear train 182 rotatably attached to the output shaft 170. The gear box 178 is mounted to the second end 158 of the second housing 150. A mounting plate 186 is provided. The mounting plate 186 is driven at an axis of rotation 190 by a drive shaft 194 of the gear box 178 and has at least one attachment fixture 198 for securing the mounting plate 186 to either equipment for positioning 62 or a mounting surface 66.

A clamping block 70 is provided. The block 70 has a first pair of parallel mounting holes 74 and a second pair of parallel mounting holes 78 located orthogonally to the first pair 74. The mounting holes 74, 78 are sized and shaped to fit slidably about either of the first 22 and second 150 housings. A securing fixture 82 is provided. The fixture 82 secures the housings 22, 150 in any two of the orthogonally located mounting holes 74, 78. When the inline rotational platform 14 and the right angle rotational platform 146 are secured in two orthogonally located mounting holes 74, 78 of the clamping block 70, a mounting plate of one of the platforms 14, 146 is secured to a mounting surface 66 and a mounting plate of another of the platforms 14, 146 is secured to the equipment for positioning 62, the equipment 62 will pan and tilt according to input to the rotational platforms 14, 146.

(7) In still a further variant, as illustrated in FIG. 1, a gear train 86 is provided. The gear train 86 is located between the drive motor 38 and the output shaft 42 of the inline rotational platform 14.

(8) In yet a further variant, a first resilient sleeve 90 is provided. The first sleeve 90 is sized and shaped to fir closely between the first housing 22 and the drive motor 38 of the inline rotational platform 14.

(9) In another variant of the invention, as illustrated in FIG. 4, a second resilient sleeve 202 is provided. The second sleeve 202 is sized and shaped to fir closely between the second housing 150 and the drive motor 166 of the right angle rotational platform 146.

(10) In still another variant, as illustrated in FIGS. 4 and 5, the clamping block 70 further includes a first slit 94. The first slit 94 extends between the first pair of parallel mounting holes 74. A second slit 98 is provided. The second slit 98 extends between the second pair of parallel mounting holes 78. The securing fixture 82 compresses the first 94 and second 98 slits to secure the first 22 and second 150 housings within the mounting holes 74, 78.

(11) In yet another variant, as illustrated in FIG. 3, the securing fixture 82 further includes an aperture 102. The aperture 102 has a first end 106, a second end 110 and is located between both of the first 74 and second 78 pairs of parallel mounting holes. The aperture 102 has an internal thread 114 adjacent the first end 106 and an opening 118 at the second end 110. A bolt 122 is provided. The bolt 122 is sized and shaped to fit slidably into the aperture 102, has a mating external thread 126 at a distal end 130, a head 134 larger than the aperture 102 at a proximal end 138 and a turning feature 142 located upon the head 134.

Figure 6:
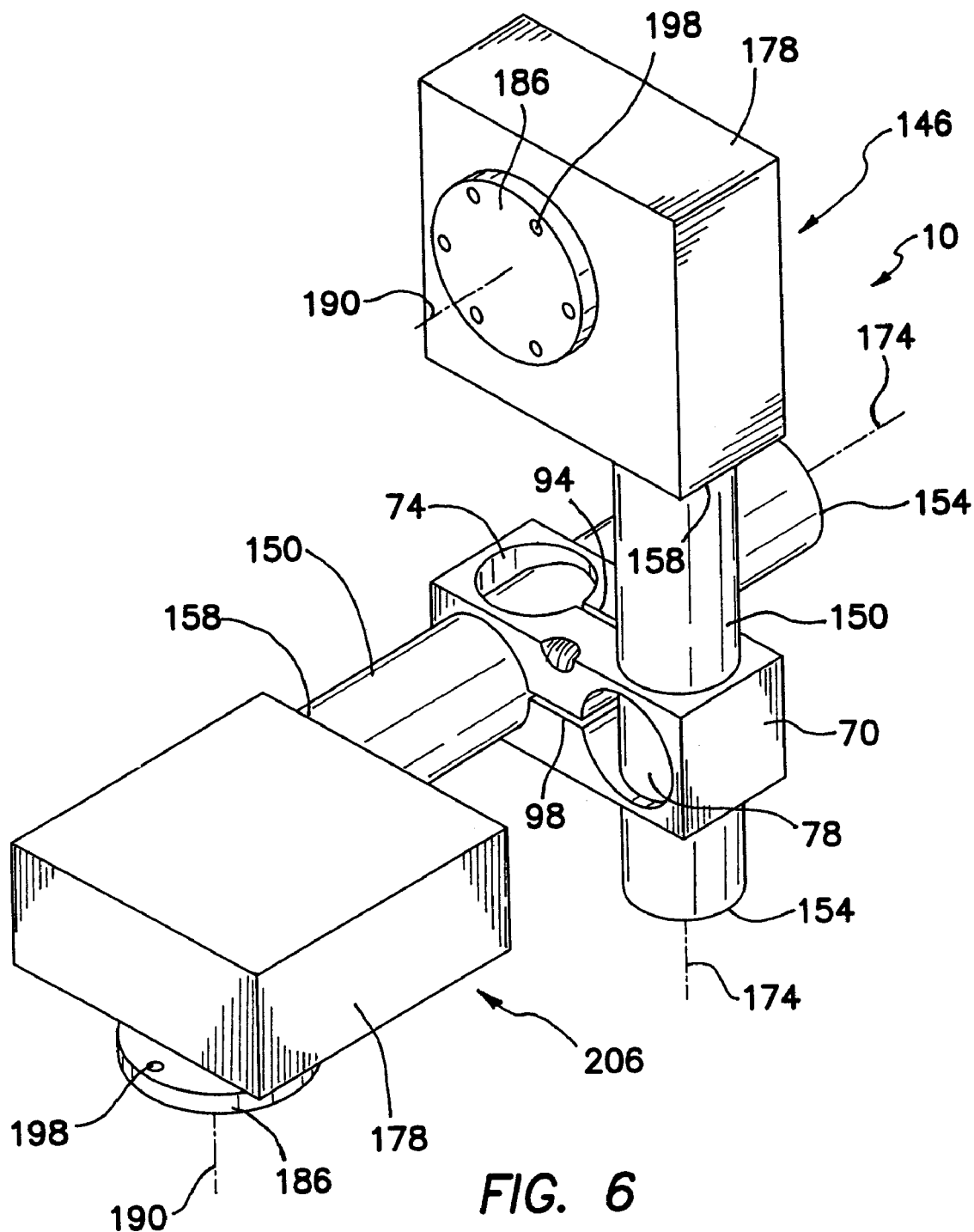
FIG. 6 is a perspective view of a third embodiment of the invention illustrating an two right angle rotational platforms and the clamping block.
Figure 7:
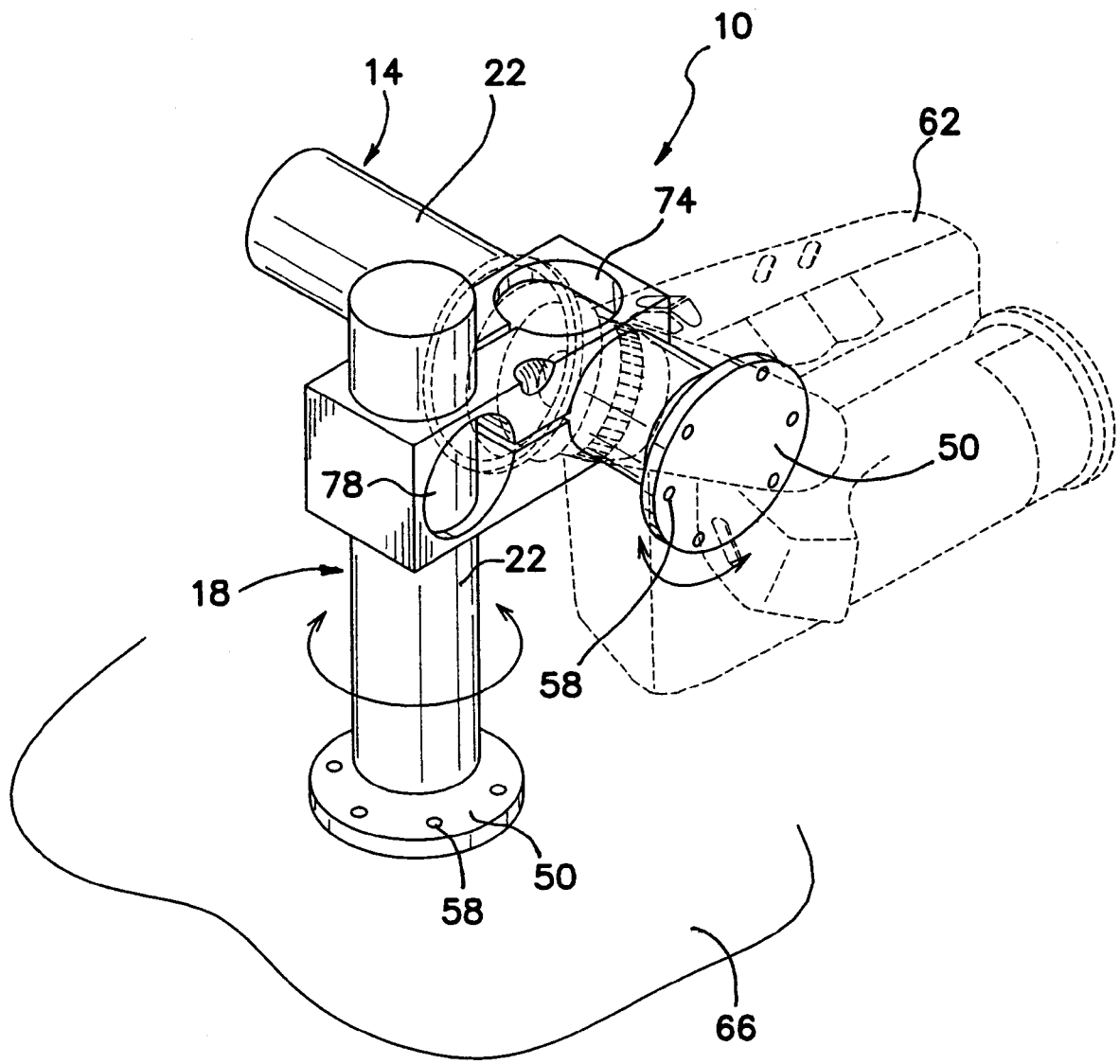
FIG. 7 is a perspective view of the FIG. 2 embodiment of the invention secured to a surface and to equipment for positioning.

(12) In a further variant, as illustrated in FIG. 6, a modular pan and tilt system, includes first 146 and second 206 right angle rotational platforms. Each of the right angle platforms 146, 206 includes a housing 150. The housing 150 has a first end 154, a second end 158, a cross-section of uniform dimensions 162 extending from the first end 154 toward the second end 158. A drive motor 166 is provided. The drive motor 166 is mounted within the housing 150 and has an output shaft 170 parallel to a long axis 174 of the housing 150. A gear box 178 is provided. The gear box 178 has a right angle gear train 182 rotatably attached to the output shaft 170. The gear box 178 is mounted to the second end 158 of the second housing 150. A mounting plate 186 is provided. The mounting plate 186 is driven at an axis of rotation 190 by a drive shaft 194 of the gear box 178 and has at least one attachment fixture 198 for securing the mounting plate 186 to either equipment for positioning 62 or a mounting surface 66.

A clamping block 70 is provided. The block 70 has a first pair of parallel mounting holes 74 and a second pair of parallel mounting holes 78 located orthogonally to the first pair 74. The mounting holes 74, 78 are sized and shaped to fit slidably about housings 150. A securing fixture 82 is provided. The fixture 82 secures the housings 150 in any two of the orthogonally located mounting holes 74, 78. When the right angle rotational platforms 146 are secured in two orthogonally located mounting holes 74, 78 of the clamping block 70, a mounting plate of one of the platforms 146, 206 is secured to a mounting surface 66 and a mounting plate of another of the platforms 146, 206 is secured to the equipment for positioning 62, the equipment 62 will pan and tilt according to input to the rotational platforms 146, 206.

(13) In still a further variant, as illustrated in FIG. 4, a resilient sleeve 202 is provided. The sleeve 202 is sized and shaped to fir closely between the housing 150 and the drive motor 166 of the right angle rotational platform 146.

(14) In yet a further variant, as illustrated in FIG. 6, the clamping block 70 further includes a first slit 94. The first slit 94 extends between the first pair of parallel mounting holes 74. A second slit 98 is provided. The second slit 98 extends between the second pair of parallel mounting holes 78. The securing fixture 82 compresses the first 94 and second 98 slits to secure the housings 150 within the mounting holes 74, 78.

(15) In a final variant of the invention, as illustrated in FIG. 3, the securing fixture 82 further includes an aperture 102. The aperture 102 has a first end 106, a second end 110 and is located between both of the first 74 and second 78 pairs of parallel mounting holes. The aperture 102 has an internal thread 114 adjacent the first end 106 and an opening 118 at the second end 110. A bolt 122 is provided. The bolt 122 is sized and shaped to fit slidably into the aperture 102, has a mating external thread 126 at a distal end 130, a head 134 larger than the aperture 102 at a proximal end 138 and a turning feature 142 located upon the head 134.

The modular pan and tilt system 10 has been described with reference to particular embodiments. Other modifications and enhancements can be made without departing from the spirit and scope of the claims that follow.

The invention claimed is:

1. A modular pan and tilt system for positioning equipment, comprising:
   first and second inline rotational platforms, each of said inline platforms comprising:
   a housing, said housing having a first end, a second end, a cross-section of uniform dimensions extending from said first end toward said second end;
   a drive motor, said drive motor being mounted within said housing and having an output shaft parallel to a long axis of said housing;
   a mounting plate, said mounting plate being driven at an axis of rotation by said output shaft and having at least one attachment fixture for securing said mounting plate to either of equipment for positioning and a mounting surface;

a clamping block, said block having a first pair of parallel mounting holes, a second pair of parallel mounting holes disposed orthogonally to said first pair, said mounting holes being sized and shaped to fit slidably about said housing and a securing fixture, said fixture securing said housings in any two of said orthogonally disposed mounting holes;

whereby, when said two inline rotational platforms are secured in two orthogonally disposed mounting holes of said clamping block, a mounting plate of a first one of said platforms is secured to a mounting surface and a mounting plate of a second one of said platforms is secured to said equipment for positioning, said equipment will pan and tilt according to input to said two inline rotational platforms.

2. The modular pan and tilt system for positioning equipment, as described in claim 1, further comprising a gear train, said gear train being disposed between said axis of rotation of said mounting plate and said output shaft of at least one of said inline rotational platforms.

3. The modular pan and tilt system for positioning equipment, as described in claim 1, further comprising a resilient sleeve, said sleeve being sized and shaped to fir closely between said housing and said drive motor of at least one of said inline rotational platforms.

4. The modular pan and tilt system for positioning equipment, as described in claim 1, wherein said clamping block further comprises:

a first slit, said first slit extending between said first pair of parallel mounting holes;

a second slit, said second slit extending between said second pair of parallel mounting holes; and said securing fixture compressing said first and second slits to secure said housings within said mounting holes.

5. The modular pan and tilt system for positioning equipment, as described in claim 4, wherein said securing fixture further comprises:

an aperture, said aperture having a first end, a second end, being disposed between both of said first and second pairs of parallel mounting holes, having an internal thread adjacent said first end and an opening at said second end; and a bolt, said bolt being sized and shaped to fit slidably into said aperture, having a mating external thread at a distal end, a head larger than said aperture at a proximal end and a turning feature disposed upon said head.

6. A modular pan and tilt system for positioning equipment, comprising:

an inline rotational platform, said inline platform comprising:

a first housing, said first housing having a first end, a second end, a cross-section of uniform dimensions extending from said first end toward said second end;

a drive motor, said drive motor being mounted within said first housing and having an output shaft parallel to a long axis of said housing;

a mounting plate, said mounting plate being driven at an axis of rotation by said output shaft and having at least one attachment fixture for securing said mounting plate to either of equipment for positioning and a mounting surface;

a right angle rotational platform, said right angle platform comprising:

a second housing, said second housing having a first end, a second end, a cross-section of uniform dimensions extending from said first end toward said second end;

a drive motor, said drive motor being mounted within said second housing and having an output shaft parallel to a long axis of said second housing;

a gear box, said gear box having a right angle gear train rotatably attached to said output shaft and being mounted to said second end of said second housing;

a mounting plate, said mounting plate being driven at an axis of rotation by a drive shaft of said gear box and having at least one attachment fixture for securing said mounting plate to either of equipment for positioning and a mounting surface;

a clamping block, said block having a first pair of parallel mounting holes, a second pair of parallel mounting holes disposed orthogonally to said first pair, said mounting holes being sized and shaped to fit slidably about either of said first and second housings and a securing fixture, said fixture securing said housings in any two of said orthogonally disposed mounting holes;

whereby, when said inline rotational platform and said right angle rotational platform are secured in two orthogonally disposed mounting holes of said clamping block, a mounting plate of one of said platforms is secured to a mounting surface and a mounting plate of another of said platforms is secured to said equipment for positioning, said equipment will pan and tilt according to input to said rotational platforms.

7. The modular pan and tilt system for positioning equipment, as described in claim 6, further comprising a gear train, said gear train being disposed between said axis of rotation of said mounting plate and said output shaft of said inline rotational platform.

8. The modular pan and tilt system for positioning equipment, as described in claim 6, further comprising a first resilient sleeve, said first sleeve being sized and shaped to fir closely between said first housing and said drive motor of said inline rotational platform.

9. The modular pan and tilt system for positioning equipment, as described in claim 6, further comprising a second resilient sleeve, said second sleeve being sized and shaped to fir closely between said second housing and said drive motor of said right angle rotational platform.

10. The modular pan and tilt system for positioning equipment, as described in claim 6, wherein said clamping block further comprises:

a first slit, said first slit extending between said first pair of parallel mounting holes;

a second slit, said second slit extending between said second pair of parallel mounting holes; and said securing fixture compressing said first and second slits to secure said first and second housings within said mounting holes.

11. The modular pan and tilt system for positioning equipment, as described in claim 10, wherein said securing fixture further comprises:

an aperture, said aperture having a first end, a second end, being disposed between both of said first and second pairs of parallel mounting holes, having an internal thread adjacent said first end and an opening at said second end; and a bolt, said bolt being sized and shaped to fit slidably into said aperture, having a mating external thread at a distal end, a head larger than said aperture at a proximal end and a turning feature disposed upon said head.

12. A modular pan and tilt system for positioning equipment comprising:

first and second right angle rotational platforms, each of said right angle platforms comprising:
    a housing, said housing having a first end, a second end, a cross-section of uniform dimensions extending from said first end toward said second end;
    a drive motor, said drive motor being mounted within said housing and having an output shaft parallel to a long axis of said housing;
    a gear box, said gear box having a right angle gear train rotatably attached to said output shaft and being mounted to said second end of said housing;
    a mounting plate, said mounting plate being driven at an axis of rotation by a drive shaft of said gear box and having at least one attachment fixture for securing said mounting plate to either of equipment for positioning and a mounting surface;
a clamping block, said block having a first pair of parallel mounting holes, a second pair of parallel mounting holes disposed orthogonally to said first pair, said mounting holes being sized and shaped to fit slidably about said housings and a securing fixture, said fixture securing said housings in any two of said orthogonally disposed mounting holes;
whereby, when said right angle rotational platforms are secured in two orthogonally disposed mounting holes of said clamping block, a mounting plate of one of said platforms is secured to a mounting surface and a mounting plate of another of said platforms is secured to said equipment for positioning, said equipment will pan and tilt according to input to said two right angle rotational platforms.

13. The modular pan and tilt system for positioning equipment, as described in claim 12, further comprising a resilient sleeve, said sleeve being sized and shaped to fir closely between said housing and said drive motor of said right angle rotational platform.

14. The modular pan and tilt system for positioning equipment, as described in claim 12, wherein said clamping block further comprises:
    a first slit, said first slit extending between said first pair of parallel mounting holes;
    a second slit, said second slit extending between said second pair of parallel mounting holes; and
    said securing fixture compressing said first and second slits to secure said housings within said mounting holes.

15. The modular pan and tilt system for positioning equipment, as described in claim 14, wherein said securing fixture further comprises:
    an aperture, said aperture having a first end, a second end, being disposed between both of said first and second pairs of parallel mounting holes, having an internal thread adjacent said first end and an opening at said second end; and
    a bolt, said bolt being sized and shaped to fit slidably into said aperture, having a mating external thread at a distal end, a head larger than said aperture at a proximal end and a turning feature disposed upon said head.

* * * * *